US010619081B2

(12) United States Patent
Eichler-Johnson et al.

(10) Patent No.: US 10,619,081 B2
(45) Date of Patent: Apr. 14, 2020

(54) HOT MELT ADHESIVE COMPOSITION

(71) Applicant: H.B. Fuller Company, St. Paul, MN (US)

(72) Inventors: Beth M. Eichler-Johnson, St. Paul, MN (US); Thomas F. Kauffman, Woodbury, MN (US); James E. Welton, Coon Rapids, MN (US); Andrew R. Michel, Plymouth, MN (US)

(73) Assignee: H.B. Fuller Company, St. Paul, MN (US)

(*) Notice: Subject to any disclaimer, the term of this patent is extended or adjusted under 35 U.S.C. 154(b) by 70 days.

(21) Appl. No.: 15/986,372

(22) Filed: May 22, 2018

(65) Prior Publication Data

US 2018/0334597 A1    Nov. 22, 2018

Related U.S. Application Data

(60) Provisional application No. 62/509,548, filed on May 22, 2017.

(51) Int. Cl.
| | | |
|---|---|---|
| *C09J 165/00* | (2006.01) |
| *C09J 123/12* | (2006.01) |
| *C09J 123/08* | (2006.01) |
| *C09J 123/14* | (2006.01) |

(52) U.S. Cl.
CPC ....... *C09J 165/00* (2013.01); *C09J 123/0815* (2013.01); *C09J 123/0853* (2013.01); *C09J 123/12* (2013.01); *C09J 123/14* (2013.01); *C08L 2205/03* (2013.01); *C08L 2205/035* (2013.01)

(58) Field of Classification Search
CPC ............ C09J 123/0815; C09J 123/0853; C09J 123/12; C09J 123/14; C09J 153/02; C09J 153/025; C08L 2205/03; C08L 2205/035
See application file for complete search history.

(56) References Cited

U.S. PATENT DOCUMENTS

| | | | |
|---|---|---|---|
| 3,635,861 A | 1/1972 | Russel |
| 3,644,267 A | 2/1972 | Jackson, Jr. et al. |
| 3,738,907 A | 6/1973 | Bronstert et al. |
| 3,864,301 A | 2/1975 | Dollhausen et al. |
| 3,903,060 A | 9/1975 | Henk et al. |
| 4,146,523 A | 3/1979 | Favié |
| 4,376,179 A | 3/1983 | Agarwal et al. |
| 4,394,915 A | 7/1983 | Nelson |
| 4,429,076 A | 1/1984 | Saito et al. |
| 4,600,648 A | 7/1986 | Yazaki et al. |
| 4,632,959 A | 12/1986 | Nagano |
| 4,659,785 A | 4/1987 | Nagano et al. |
| 4,868,057 A | 9/1989 | Himes |
| 4,954,550 A | 9/1990 | Sorg |
| 5,223,311 A | 6/1993 | Tsutsumi et al. |
| 5,225,482 A | 7/1993 | Nakagawa et al. |
| 5,227,426 A | 7/1993 | Tse et al. |
| 5,387,623 A | 2/1995 | Ryan et al. |
| 5,401,455 A | 3/1995 | Hatfield et al. |
| 5,401,792 A | 3/1995 | Babu et al. |
| 5,618,883 A | 4/1997 | Plamthottam et al. |
| 5,783,302 A | 7/1998 | Bitler et al. |
| 5,869,555 A | 2/1999 | Simmons et al. |
| RE36,177 E | 4/1999 | Rouyer et al. |
| 5,912,315 A | 6/1999 | Horiie |
| 6,072,003 A | 6/2000 | Harrion et al. |
| 6,136,923 A | 10/2000 | Cheung et al. |
| 6,235,818 B1 | 5/2001 | Morizono et al. |
| 6,242,525 B1 | 6/2001 | Raetzsch et al. |
| 6,329,468 B1 | 12/2001 | Wang et al. |
| 6,582,829 B1 | 6/2003 | Quinn et al. |
| 6,632,522 B1 | 10/2003 | Hyde et al. |
| 6,653,385 B2 | 11/2003 | Wang et al. |
| 6,815,058 B2 | 11/2004 | Wantanabe et al. |
| 6,858,676 B1 | 2/2005 | Johoji et al. |
| 7,064,168 B2 | 6/2006 | Benz et al. |
| 7,199,180 B1 | 4/2007 | Simmons |
| 7,262,251 B2 | 8/2007 | Wang et al. |
| 7,381,771 B2 | 6/2008 | Ouhadi et al. |
| 7,723,434 B2 | 5/2010 | Sugiura et al. |
| 7,781,523 B2 | 8/2010 | Kang et al. |

(Continued)

FOREIGN PATENT DOCUMENTS

| | | |
|---|---|---|
| EP | 0301867 A2 | 2/1989 |
| EP | 0535526 B1 | 4/1993 |
| EP | 410412 B1 | 1/1994 |
| EP | 478800 B1 | 7/1995 |
| EP | 1050557 B1 | 11/2000 |
| EP | 1631641 B1 | 3/2007 |
| EP | 1396504 B1 | 1/2009 |
| GB | 1449739 | 9/1976 |
| WO | WO91/14750 | 10/1991 |
| WO | WO 2011022523 | 2/2011 |
| WO | WO 2013/134038 | 9/2013 |
| WO | WO2014099098 A1 | 6/2014 |
| WO | WO 2016026120 | 2/2016 |
| WO | WO 2016028970 | 2/2016 |
| WO | WO2016/100728 A3 | 8/2016 |
| WO | WO2017/017136 A1 | 2/2017 |

*Primary Examiner* — Jeffrey C Mullis
(74) *Attorney, Agent, or Firm* — Kirsten Stone; Allison Johnson

(57) ABSTRACT

A hot melt adhesive composition that includes a first ethylene alpha-olefin copolymer having a density of no greater than 0.90 grams per cubic centimeter, a second styrene block copolymer, tackifying agent, synthetic wax having a melt temperature of at least 70° C. and a heat of fusion of at least 200 Joules/gram, and a third polymer selected from the group consisting of ethylene-polar comonomer copolymer derived from at least 90 mole % ethylene and no greater than 10 mole % co-monomer, propylene-alpha-olefin copolymer derived from at least 8 mole % co-monomer, exhibiting a heat of fusion of from at least 5 J/g to no greater than 60 J/g, and having a polydispersity index of no greater than 10, and propylene homopolymer exhibiting a heat of fusion of from at least 5 J/g to no greater than 60 J/g.

23 Claims, No Drawings

(56) References Cited

U.S. PATENT DOCUMENTS

| | | |
|---|---|---|
| 8,163,833 B2 | 4/2012 | Moeller et al. |
| 8,461,264 B2 | 6/2013 | Arai et al. |
| 8,487,026 B2 | 7/2013 | Bach et al. |
| 8,828,271 B2 | 9/2014 | Zhang |
| 8,921,474 B2 | 12/2014 | Alper et al. |
| 9,200,185 B2 | 12/2015 | Knutson et al. |
| 9,334,431 B2 | 5/2016 | Hamann et al. |
| 9,469,791 B2 | 10/2016 | Knutson et al. |
| 9,522,213 B2 | 12/2016 | Davis et al. |
| 9,598,615 B2 | 3/2017 | Fujinami et al. |
| 9,605,185 B2 | 3/2017 | Kobayashi et al. |
| 9,605,186 B2 | 3/2017 | Tse et al. |
| 2004/0115456 A1 | 6/2004 | Kanderski et al. |
| 2006/0264539 A1 | 11/2006 | Mosseveld et al. |
| 2007/0054982 A1 | 3/2007 | Banerjie et al. |
| 2007/0282072 A1 | 12/2007 | Hoffmann et al. |
| 2009/0036619 A1* | 2/2009 | Herrmann ............... C08F 10/06 526/127 |
| 2009/0202847 A1 | 8/2009 | Eberhardt et al. |
| 2010/0273012 A1 | 10/2010 | Moriguchi et al. |
| 2011/0247304 A1 | 10/2011 | Kalelenhoff |
| 2012/0165455 A1 | 6/2012 | Vitrano et al. |
| 2012/0259050 A1 | 10/2012 | Vitrano et al. |
| 2012/0329353 A1 | 12/2012 | Davis et al. |
| 2013/0130027 A1 | 5/2013 | Curry et al. |
| 2013/0009421 A1 | 11/2013 | Vitrano et al. |
| 2014/0015489 A1 | 1/2014 | Pardue |
| 2014/0272214 A1 | 9/2014 | Ellis et al. |
| 2014/0335299 A1 | 11/2014 | Wang et al. |
| 2014/0350164 A1* | 11/2014 | Oda ....................... C09J 153/02 524/505 |
| 2015/0024649 A1 | 1/2015 | Czaplewski et al. |
| 2015/0073093 A1* | 3/2015 | Isobe .................... C09J 151/06 525/69 |
| 2015/0087760 A1 | 3/2015 | Kanderski |
| 2015/0104639 A1 | 4/2015 | Schroeyers et al. |
| 2015/0135113 A1 | 5/2015 | Sekharan |
| 2015/0148473 A1 | 5/2015 | Sustic et al. |
| 2015/0166849 A1 | 6/2015 | Inoue |
| 2015/0183986 A1 | 7/2015 | Kim et al. |
| 2015/0299526 A1 | 10/2015 | Gray et al. |
| 2015/0322301 A1 | 11/2015 | Ellis et al. |
| 2016/0009965 A1 | 1/2016 | Robert |
| 2016/0017081 A1 | 1/2016 | Besser et al. |
| 2016/0160086 A1 | 6/2016 | Schneider |
| 2016/0237329 A1 | 8/2016 | Takenaka et al. |
| 2016/0272853 A1* | 9/2016 | Takamori ............... C08L 23/02 |
| 2016/0376479 A1 | 12/2016 | Bao et al. |

* cited by examiner

HOT MELT ADHESIVE COMPOSITION

This application claims the benefit of U.S. Provisional Application No. 62/509,548 filed May 22, 2017, which is incorporated herein.

BACKGROUND

The invention is directed to formulating hot melt adhesive compositions that exhibit strong adhesive bonds, fast set times, and good cold temperature bonding properties.

Hot melt adhesive compositions are often used to bond two substrates together and are applied in a molten state to a substrate. To be commercially viable, most hot melt adhesive compositions must maintain adhesion to the substrate at room temperature and, to be suitable for use in high speed packaging operations, the adhesive must also exhibit a fast set time and a fiber tearing bond. For many applications, it is also desirable for the adhesive to exhibit a fiber tearing bond at cold temperatures.

A variety of different types of polymers are used in a variety of different hot melt adhesive compositions. However, it is often difficult to combine different types of polymers in the same composition, because polymers tend to be incompatible with one another, to phase separate when heated, to phase separate upon aging, or to exhibit a combination of these properties. Ethylene vinyl acetate, for example, tends to be incompatible with styrene block copolymers.

Synthetic waxes also tend to present hot melt adhesive formulation problems. Synthetic waxes tend to be incompatible with styrene block copolymers and ethylene vinyl acetate.

There is a need for a hot melt adhesive composition that exhibits a fast set time, exhibits good fiber tearing adhesive properties at low temperatures, and maintains homogeneity.

SUMMARY

In one aspect, the invention features a hot melt adhesive composition that includes a first copolymer that includes an ethylene alpha-olefin copolymer having a density of no greater than 0.90 grams per cubic centimeter (g/cm$^3$), a second copolymer that includes styrene block copolymer, tackifying agent, synthetic wax having a melt temperature of at least 70° C. and a heat of fusion of at least 200 Joules/gram (J/g), and at least 5% by weight of a third polymer selected from the group consisting of ethylene-polar comonomer copolymer derived from at least 90 mole % ethylene to no greater than 10 mole % polar co-monomer, and propylene-alpha-olefin copolymer derived from at least 8 mole % co-monomer, having a heat of fusion of from at least 5 J/g to no greater than 60 J/g, and a polydispersity index of no greater than 10, and propylene homopolymer exhibiting a heat of fusion of from at least 5 J/g to no greater than 60 J/g. In one embodiment, the synthetic wax is a wax derived from ethylene, a Fischer Tropsch wax, or a combination thereof. In other embodiments, the composition exhibits a set time of no greater than 1 second. In some embodiments, the composition exhibits a set time of no greater than 0.8 seconds.

In one embodiment, the third polymer is an ethylene-polar comonomer copolymer selected from the group consisting of ethylene vinyl acetate, ethylene alkyl-acrylate, and combinations thereof. In another embodiment, the third polymer is an ethylene-polar comonomer copolymer selected from the group consisting of ethylene vinyl acetate, ethylene methyl acrylate, ethylene n-butylacrylate, and combinations thereof. In other embodiments, the third polymer includes ethylene vinyl acetate derived from no greater than 8 mole % vinyl acetate.

In some embodiments, the composition exhibits a viscosity of no greater than 1500 cP at 177° C. In other embodiments, the composition exhibits a viscosity of no greater than 1500 cP at a temperature of no greater than 135° C. In another embodiment, the composition exhibits a viscosity of no greater than 1500 cP at 121° C.

In another embodiment, the hot melt adhesive composition includes from 5% by weight to 25% by weight of the ethylene alpha-olefin copolymer, from 2% by weight to 15% by weight styrene block copolymer, from 15% by weight to 50% by weight tackifying agent, from 10% by weight to 35% by weight of the synthetic wax, and from 5% by weight to 25% by weight of the third polymer. In one embodiment, the styrene block copolymer comprises at least one of styrene-isoprene-styrene, styrene-butadiene-styrene, styrene-ethylene-propylene-styrene, and styrene-ethylene-butylene-styrene, and styrene-ethylene-ethylene-propylene-styrene. In another embodiment, the styrene block copolymer comprises styrene-ethylene-butylene-styrene. In other embodiments, the styrene block copolymer derived from less than 35% by weight styrene.

In some embodiments, the third polymer includes the ethylene-polar comonomer copolymer, and the ethylene-polar comonomer copolymer includes ethylene vinyl acetate derived from less than 20% by weight vinyl acetate. In other embodiments, the third polymer includes the ethylene-polar comonomer copolymer, and the ethylene-polar comonomer copolymer includes ethylene n-butyl acrylate derived from less than 30% by weight n-butyl acrylate. In one embodiment, the styrene block copolymer is derived from less than 35% by weight styrene, and the third polymer includes at least one of ethylene vinyl acetate derived from less than 20% by weight vinyl acetate and ethylene n-butyl acrylate derived from less than 30% by weight n-butyl acrylate.

In one embodiment, the composition exhibits a peel adhesion failure temperature of at least 50° C. In another embodiment, the composition exhibits at least 80% fiber tear at −29° C. In other embodiments, the composition exhibits at least 50% fiber tear at −29° C. In some embodiments, the composition is homogeneous when tested according to the Clarity and Homogeneity Test Method.

The invention features a hot melt adhesive composition that exhibits a fast set time exhibits good fiber tearing adhesive properties at low temperatures, and is homogenous at elevated temperatures.

Other features and advantages will be apparent from the following description of the preferred embodiments and from the claims.

GLOSSARY

In reference to the invention, the following terms have the meanings set forth below:

The phrase "application temperature" refers to the temperature of the hot melt adhesive composition when it is applied to a substrate.

DETAILED DESCRIPTION

The hot melt adhesive composition includes a first ethylene alpha-olefin copolymer, a second styrene block copolymer, tackifying agent, synthetic wax, and a third polymer selected from the group consisting of ethylene-polar comonomer copolymer, propylene copolymer, propylene homopolymer, and combinations thereof. The sum of the ethylene alpha-olefin copolymer, the styrene block copolymer and the third polymer preferably constitutes at least 20% by weight, at least 25% by weight at least 30% by weight, from about 20% by weight to about 50% by weight, from about 25% by weight to about 45% by weight or even from about 30% by weight to about 40% by weight of the hot melt adhesive composition.

The hot melt adhesive composition preferably exhibits a viscosity of no greater than 2000 centipoise (cP), or even no greater than 1500 cP at 177° C., at 150° C., at 135° C., or even at 121° C.

The hot melt adhesive composition preferably exhibits a set time of no greater than 1.5 seconds (sec), no greater than 1.0 sec, or even no greater than 0.8 sec at the application temperature, e.g., 177° C., 150° C., 135° C., or even 121° C., and at least 50%, at least 70%, at least 80%, or even at least 100% fiber tear at 22° C., 4° C., −18° C., or even −29° C.

The hot melt adhesive composition also preferably has a peel adhesion failure temperature (PAFT) of at least 45° C., at least 50° C., or even at least 55° C.

The hot melt adhesive composition also preferably is clear and homogeneous after 16 hours or even after 48 hours when tested according to the Clarity and Homogeneity Test Method.

Ethylene Alpha-Olefin Copolymer

The ethylene alpha-olefin copolymer has a density of no greater than 0.90 grams per cubic centimeter (g/cm$^3$), or even no greater than 0.88 g/cm$^3$. The ethylene alpha-olefin copolymer exhibits a melt index of from about 1 g/10 minutes (min) to about 2500 g/10 min, or even from about 400 g/10 min to about 1200 g/10 min at 190° C. using a 2.16 kilogram (kg) weight as measured according to ASTM D1238.

The ethylene alpha-olefin copolymer is derived from at least 60 mole %, at least 65 mole %, or even at least 70 mole % ethylene, and an alpha-olefin monomer. The alpha-olefin monomer has at least three carbon atoms, or even from three to 20 carbon atoms, suitable examples of which include propylene, isobutylene, butene, pentene, hexene, heptene, octene, nonene, decene, dodecene, 4-methyl-1-pentene, 3-methyl pentene-1,3,5,5-trimethyl-hexene-1, 5-ethyl-1-nonene, and combinations thereof. Specific examples of suitable ethylene copolymers include ethylene-propylene, ethylene-butene, ethylene-hexene, ethyene-octene, and combinations thereof. The ethylene alpha-olefin copolymer optionally includes functional groups including, e.g., carboxylic acid groups, anhydride groups (e.g., maleic anhydride), and combinations thereof.

The ethylene alpha-olefin copolymer can be prepared using a variety of catalysts including, e.g., a single site catalyst (e.g., metallocene catalysts (e.g., metallocene catalyzed ethylene alpha-olefin copolymers), constrained geometry catalysts (e.g., homogeneous linear or substantially linear ethylene alpha-olefin interpolymers prepared from ethylene and an alpha-olefin comonomer using a constrained geometry catalyst and having a polydispersity index of no greater than 2.5 and long chain branching)), multiple single site catalysts, and combinations thereof.

Useful ethylene alpha-olefin copolymers include ethylene alpha-olefin copolymers polymerized to their final molecular weight in reactor, ethylene alpha-olefin copolymers subjected to chain scission to achieve their final molecular weight, and mixtures thereof.

Useful ethylene alpha-olefin copolymers are commercially available under of a variety of trade designations including, e.g., the AFFINITY series of trade designations from DowDuPont Chemical Company (Midland, Mich.) including, e.g., AFFINITY GA 1875, AFFINITY GA 1900, and AFFINITY GA 1950 ethylene-octene elastomers, AFFINITY GA 1000R maleic anhydride-modified ethylene-octene copolymer (which is also referred to as an interpolymer by the manufacturer), and AFFINITY ethylene-propylene copolymers, the ENGAGE series of trade designations from DowDuPont Chemical Company (Midland, Mich.) including ENGAGE 8400, ENGAGE 8401, and ENGAGE 8402 ethylene-octene copolymers, the QUEO series of trade designations from Borealis, the INFUSE series of trade designations from DowDuPont Chemical Company (Midland, Mich.) including INFUSE 9500 ethylene-ethylene-propylene copolymer, the SABIC POE series of trade designations from Saudi Basic Industries Corp. (Pittsfield, Mass.) including SABIC POE C30070D, the LUCENE series of trade designations from LG, the TAFMER series of trade designations from MITSUI, and the EXACT series of trade designations from ExxonMobil Chemical Company (Houston, Tex.) including, e.g., EXACT 9061 ethylene butene copolymer.

The hot melt adhesive composition includes at least 5% by weight, at least 10% by weight, from 5% by weight to about 25% by weight, from 5% by weight to about 20% by weight, or even from about 10% by weight to about 20% by weight ethylene alpha-olefin copolymer.

Synthetic Wax

The synthetic wax has a melt temperature (Tm) of at least 70° C., at least 80° C., at least 90° C., at least 100° C., from 70° C. to about 130° C., from 70° C. to about 120° C., from 70° C. to about 110° C., or even from 80° C. to about 105° C. and a heat of fusion of at least 200 Joules/gram (J/g), at least 210 J/g, or even at least 220 J/g. The synthetic wax is derived from ethylene (e.g., at least about 95 mole % ethylene) and, optionally, additional co-monomers including, e.g., propylene. Suitable synthetic waxes include, e.g., polyethylene waxes, Fischer Tropsch waxes, metallocene catalyzed polyethylene waxes, and combinations thereof.

Useful polyethylene waxes are commercially available under a variety of trade designations including, e.g., the EPOLENE series of trade designations from Westlake Chemical Corporation (Houston, Tex.) including, e.g., EPOLENE N-21 and N-14 polyethylene waxes, the BARECO series of trade designations from Baker Hughes Inc. (Sugar Land, Tex.) including, e.g., BARECO C4040 polyethylene wax, the AC series of trade designations from Honeywell Int'l Inc. (Morristown, N.J.) including, e.g., A-C 8 and A-C 9 polyethylene waxes, the POLYWAX series of trade designations including POLYWAX 3000, 500, 1500, and 2000 polyethylene waxes from Baker Hughes (Houston, Tex.), and CWP 400 polyethylene wax from SSI CHUSEI, Inc. (Pasedena, Tex.).

Useful Fischer Tropsch waxes are commercially available under a variety of trade designations including, e.g., the BARECO series of trade designations from Baker Hughes Inc. (Sugar Land, Tex.) including, e.g., BARECO PX-100 and PX-105 Fischer Tropsch waxes, the SHELLWAX and SARAWAX-SX-105 series of trade designations from Shell Malaysia Ltd. (Kuala Lumpur, Malaysia) including, e.g., SHELLWAX SX100, SX105, SX-70, and SX-80, and SARAWAX SX100 and SX105 Fischer Tropsch waxes, the VESTOWAX series of trade designations from Evonik Industries AG (Germany) including, e.g., VESTOWAX 2050 Fischer Tropsch wax, and the SASOLWAX series of trade designations from Sasol Wax North America Corporation (Hayward, Calif.) including, e.g., SASOLWAX H105, C80, H1, and H4 Fischer Tropsch waxes.

Useful metallocene catalyzed polyethylene waxes are commercially available under a variety of trade designations including, e.g., LICOWAX from Clariant Int'l Ltd. (Muttenz, Switzerland), and TRECORA CWP-100 from Trecora Chemical (Pasadena, Tex.).

The hot melt adhesive composition includes at least 10% by weight, at least 15% by weight, at least 20% by weight, at least 25%, no greater than about 35% by weight, from about 10% by weight to about 35% by weight, from about 20% by weight to about 35% by weight, or even from about 25% by weight to about 35% by weight synthetic wax.

Styrene Block Copolymer

The styrene block copolymer has at least one A block that includes styrene and at least one B block that includes, e.g., elastomeric conjugated dienes (e.g., hydrogenated and unhydrogenated conjugated dienes), sesquiterpenes (e.g., hydrogenated and nonhydrogenated sesquiterpenes), and combinations thereof. The A blocks and the B blocks bind to one another in any manner of binding such that the resulting copolymer exhibits a variety of structures including, e.g., random, straight-chained, branched, radial, star, comb, tapered, and combinations thereof. The block copolymer can exhibit any form including, e.g., linear A-B block, linear A-B-A block, linear A-(B-A)$_n$-B multi-block, and radial (A-B)$_n$-Y block where Y is a multivalent compound and n is an integer of at least 3, tetrablock copolymer, e.g., A-B-A-B, and pentablock copolymers having a structure of A-B-A-B-A. The adhesive composition can include blends of at least two different block copolymers.

Suitable styrene A blocks include, e.g., styrene, alpha-methylstyrene, o-methylstyrene, m-methylstyrene, p-methylstyrene, p-tert-butylstyrene, 2,4-dimethylstyrene, 2,4,6-trimethylstyrene, and combinations thereof.

Suitable block elastomeric conjugated diene B blocks include, e.g., butadiene (e.g., polybutadiene), isoprene (e.g., polyisoprene), 2,3-dimethyl-1,3-butadiene, 1,3-pentadiene, 1,3-hexadiene, and combinations thereof, and hydrogenated versions thereof including, e.g., ethylene, propylene, butylene and combinations thereof.

Suitable B block sesquiterpenes include, e.g., beta farnesene.

Useful styrene block copolymers include, e.g., styrene-butadiene (SB), styrene-butadiene-styrene (SBS), styrene-isoprene block (SI), styrene-isoprene-styrene (SIS), styrene-ethylene-butylene-styrene (SEBS), styrene-ethylene-propylene-styrene (SEPS), styrene-isobutylene-styrene, and combinations thereof. Particularly useful block copolymers include styrene-ethylene-butene-styrene, styrene-ethylene-propylene-styrene, and combinations thereof.

The styrene block copolymers include from about 5% by weight to about 40% by weight, from about 10% by weight to about 30% by weight, or even from about 15% by weight to about 25% by weight styrene, and from about 95% by weight to about 60% by weight, from about 90% by weight to about 70% by weight, or even from about 85% to about 75% by weight B block. Suitable block copolymers have a melt flow index of from about 3 g/10 min to about 50 g/10 min, or even from about 5 g/10 min to about 20 g/10 min, as determined by ASTM-D 1238-95.

Useful block copolymers are commercially available under the KRATON D and G series of trade designations Kraton Corporation, from (Houston, Tex.) including, e.g., KRATON D 1163 SIS and D 1117 SIS, and KRATON G 1652 SEBS, G 1657 SEBS, G 1726 SEBS, and G 1901 SEBS, EUROPRENE Sol T trade designation from EniChem (Houston, Tex.), SEPTON trade designation from Septon Company of America (Pasadena, Tex.) including SEPTON S 1001 SEPS block copolymer, and SEPTON 4030, 4033, 4044, 4055 and 4077 block copolymers, and VECTOR series of trade designations from Taiwan Synthetic Rubber Corporation (TSRC) (Taipei City, Taiwan) including VECTOR 4211 and DPX-660 styrene-isoprene-styrene block copolymers, HSFC KL-SF 901 and KL-SF 902 hydrogenated styrene-farnesene block copolymers from Kuraray America Inc. (Houston, Tex.), and HYBRAR H7125 and H7311 hydrogenated SIS block copolymers from Kuraray.

The adhesive composition includes at least 1% by weight, at least 2% by weight from about 2% by weight to about 15% by weight, from about 2% by weight to about 10% by weight, and from about 3% by weight to about 8% by weight styrene block copolymer.

Tackifying Agent

The tackifying agent exhibits a glass transition temperature (Tg) of from about 30° C. to about 90° C. Suitable classes of tackifying agents include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin, and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, phenolic-modified pentaerythritol esters of rosin, and combinations thereof. Examples of useful polyterpene resins include polyterpene resins having a softening point, as determined by ASTM method E28-58T, of from about 80° C. to about 160° C., hydrogenated polyterpene resins, and copolymers and terpolymers of natural terpenes (e.g. styrene-terpene, alpha-methyl styrene-terpene and vinyl toluene-terpene), and combinations thereof. Examples of useful aliphatic and cycloaliphatic petroleum hydrocarbon resins include aliphatic and cycloaliphatic petroleum hydrocarbon resins having Ring and Ball softening points of from about 80° C. to 160° C., the hydrogenated derivatives thereof, and combinations thereof. Suitable aliphatic and cycloaliphatic petroleum hydrocarbon resins include, e.g., branched, unbranched, and cyclic C5 resins, C9 resins, and C10 resins.

Useful tackifying agents are commercially available under a variety of trade designations including, e.g., the ESCOREZ series of trade designations from ExxonMobil Chemical Company (Houston, Tex.) including, e.g., ESCOREZ 1310LC aliphatic hydrocarbon resin, ESCOREZ 5400 cycloaliphatic hydrocarbon resin, ESCOREZ 5637 aromatic modified, cycloaliphatic hydrocarbon resin, ESCOREZ 5415 cycloaliphatic hydrocarbon resin, ESCOREZ 5600 aromatic modified, cycloaliphatic hydrocarbon resin, ESCOREZ 5615 aromatic modified, cycloaliphatic hydrocarbon resin, and ESCOREZ 5690 aromatic modified, cycloaliphatic hydrocarbon resin, the EASTOTAC series of trade designations from Eastman Chemical Company (Kingsport, Tenn.) including, e.g., EASTOTAC H-100R, EASTOTAC H-100L, and EASTOTAC H130W hydrogenated hydrocarbon resins, the WINGTACK series of trade designations from Cray Valley HSC (Exton, Pa.) including, e.g., WINGTACK 86 aromatically modified, C-5 hydrocarbon resin, WINGTACK EXTRA aromatically modified, C-5 hydrocarbon resin, and WINGTACK 95 aliphatic C-5 petroleum hydrocarbon resin, the PICCOTAC series of trade designations from Eastman Chemical Company (Kingsport, Tenn.) including, e.g., PICCOTAC 8095 aromatically modified, C-5 hydrocarbon resin and 1115 hydrocarbon resin, the ARKON series of trade designations from Arkawa Europe GmbH (Germany) including, e.g., ARKON P-125 alicyclic saturated hydrocarbon resin, the REGALITE and REGALREZ series of trade designations from Eastman Chemical Company including, e.g, REGALITE R1125 fully hydrogenated hydrocarbon resin and REGALREZ 1126 hydrocarbon resin, and the RESINALL series of trade designations from Resinall Corp (Severn, N.C.) including RESINALL 030 hydrogenated hydrocarbon resin.

The hot melt adhesive composition includes from 15% by weight to no greater than about 50% by weight, from about 20% by weight to about 45% by weight, or even from about 25% by weight to about 40% by weight tackifying agent.

Third Polymer

The third polymer is an ethylene-polar comonomer copolymer, a propylene copolymer, a propylene homopolymer, or a combination thereof. The hot melt adhesive composition includes from 5% by weight to about 30% by weight, from 5% by weight to about 25% by weight, from 5% by weight to about 20% by weight, from about 10% by weight to about 20% by weight, from 5% by weight to about 15% by weight, or even from about 10% by weight to about 15% by weight of the third polymer.

Ethylene-Polar Comonomer Copolymer

The term "ethylene-polar comonomer copolymer," as used herein, refers to copolymers, terpolymers and higher order polymers of ethylene and a polar comonomer. The ethylene-polar comonomer copolymer is derived from at least 90 mole % ethylene and no greater than 10 mole % of the polar co-monomer. Useful polar co-monomers include vinyl acetate and alkyl acrylates (e.g., C1-C4 alkyl acrylate). Suitable ethylene-polar comonomer copolymers include, e.g., ethylene vinyl acetate, ethylene methyl acrylate, ethylene ethyl acrylate, ethylene n-butyl acrylate, ethylene acrylic acid, ethylene methyl-methacrylate, ethylene 2-ethylhexyl acrylate, and combinations thereof.

Useful ethylene vinyl acetate copolymers exhibit a melt index of less than about 2600 g/10 min, less than about 1100 g/10 min, at least 100 g/10 min, or even at least 150 g/10 min. Suitable ethylene vinyl acetate copolymers include no greater than 10 mole % (mol %), or even no greater than 8 mol % vinyl acetate. Suitable ethylene vinyl acetate copolymers include no greater than 22% by weight, or even no greater than 20% by weight vinyl acetate. Suitable copolymers of ethylene vinyl acetate are commercially available under the ATEVA series of trade designations including ATEVA 1850A and 1880A from AT Plastics, Inc. (Edmonton, Alberta, Canada), and the ESCORENE series of trade designations including, e.g., ESCORENE MV 2514 from ExxonMobil Chemical Company (Houston, Tex.), and ALCUDIA PA-407, PA-410 PA-411 and PA-420 from REPSOL (Madrid, Spain).

Useful ethylene alkyl-acrylate copolymers exhibit a melt index less than about 2500 g/10 min, or even less than about 900 g/10 min and include no greater than 10 mol %, or even no greater than 8 mol % alkyl-acrylate. Suitable ethylene n-butyl-acrylate copolymers include no greater than 33% by weight, or even no greater than 30% by weight butyl acrylate. Useful ethylene n-butyl-acrylate copolymers are commercially available under the ALCUDIA trade designations including PA-27100 and PA-27150 from Repsol (Madrid, Spain) and the ENABLE trade designations from Exxon Chemical (Houston, Tex.). Suitable ethylene methyl acrylate copolymers are commercially available under the OPTEMA trade designations from Exxon Chemical (Houston, Tex.). Useful ethylene methyl-methacrylate copolymers are commercially available under the ACRYFT trade designations from Sumitomo Chemical Company (Tokyo, Japan).

The hot melt adhesive composition preferably includes from 0% by weight to about 30% by weight, from 5% by weight to about 25% by weight, from 5% by weight to about 20% by weight, or even from 5% by weight to about 15% by weight ethylene-polar comonomer copolymer.

Propylene-Alpha-Olefin Copolymer

The propylene-alpha-olefin copolymer is derived from at least 8 mol % co-monomer, has a heat of fusion of from 5 J/g to 60 J/g, from about 5 J/g to about 55 J/g, from about 5 J/g to about 50 J/g, from about 5 J/g to about 45 J/g, or even from about 5 J/g to about 40 J/g, and a polydispersity index of no greater than 10, no greater than 8, or even no greater than 6. The propylene-alpha-olefin copolymer preferably has density of no greater than 0.90 g/cm$^3$ and exhibits a glass transition temperature (Tg) of no greater than about −10° C., no greater than about −15° C., or even no greater than about −25° C., a viscosity less than 100,000 cP, less than 50,000 cP, or even less than 20,000 cP at 190° C.

The propylene-alpha-olefin copolymer is derived from propylene and at least one alpha-olefin co-monomer other than propylene (e.g., C2, and C4-C20 alpha-olefin co-monomers, and combinations thereof). Useful alpha-olefin co-monomers include, e.g., alpha-olefin monomers having at least two carbon atoms, at least four carbon atoms, from four carbon atoms to eight carbon atoms, and combinations thereof. Examples of suitable classes of alpha-olefin co-monomers include mono-alpha olefins (i.e., one unsaturated double bond) and higher order alpha olefins (e.g., dienes (e.g., 1,9-decadiene)). Suitable alpha-olefin monomers include, e.g., ethylene, butene, pentene, hexene, heptene, octene, nonene, decene, dodecene, 4-methyl-pentene-1, 3-methyl pentene-1,3,5,5-trimethyl-hexene-1, 5-ethyl-1-nonene, and combinations thereof. Specific examples of suitable propylene-alpha-olefin copolymers include propylene-ethylene, propylene-butene, propylene-hexene, propylene-octene, and combinations thereof.

The propylene-alpha-olefin copolymer preferably is derived from at least 8 mol % at least about 10 mol %, no greater than about 50 mol %, no greater than about 40 mol %, no areater than 37.5 mol %, no greater than about 30 mol %, no greater than about 25 mol %, no greater than about 20 mol %, no greater than about 17 mol %, no greater than about 15 mol %, or even no greater than about 10 mol % alpha-olefin co-monomer, and at least 50 mol %, at least about 60 mol %, at least 62.5 mol %, at least 75 mol %, at least 83 mol %, at least 85 mol %, no greater than 92 mol %, no greater than 90 mol %, from about 50 mol % to about 92 mol %, from about 60 mol % to about 90 mol %, or even from about 70 mol % to about 90 mol % propylene.

Useful propylene-alpha-olefin copolymers include, e.g., copolymers, terpolymer, and higher order polymers, mixtures of at least two different propylene-alpha-olefin copolymers, and combinations thereof. Useful propylene-alpha-olefin co polymers also include, e.g., modified, unmodified, grafted, and ungrafted propylene-alpha-olefin copolymers, uni-modal propylene-alpha-olefin polymers, multi-modal propylene-alpha-olefin copolymers, and combinations thereof. The term "multi-modal" means the polymer has a multi-modal molecular weight distribution (weight average molecular weight (Mw)/number average molecular weight (Mn)) as determined by Size Exclusion Chromatography (SEC). A multi-modal molecular weight distribution exists when the SEC trace has more than one peak or inflection point (i.e., two or more inflection points). An inflection point is the point at which the second derivative changes in sign (e.g., from negative to positive or vice versa). The term "uni-modal" means the polymer has a uni-modal molecular weight distribution (Mw/Mn) as determined by SEC. A uni-modal molecular weight distribution exists when the SEC trace has only one peak. Useful multi-modal propylene-alpha-olefin polymers and methods of making the same are described in WO 2016/089851, which is incorporated herein.

The propylene-alpha-olefin copolymers can be prepared using a variety of methods including, e.g., in one or several reactors, and can be in the form of blends of several fractions prepared separately and later combined.

The propylene-alpha-olefin copolymer can be prepared using a variety of catalysts including, e.g., a single site catalyst (e.g., metallocene catalysts (e.g., metallocene-catalyzed propylene polymers)), multiple single site catalysts, non-metallocene heteroaryl catalysts, catalysts described in U.S. Pat. Nos. 6,365,539, 6,677,410, and WO 2000/050475, Ziegler-Natta, and combinations thereof. Other suitable copolymers include polymers prepared by grafting an amorphous propylene polymer onto a semi-crystalline polymer, examples of which and methods of making the same are disclosed, e.g., in U.S. Pat. No. 7,541,402 (Abhari et al.), and incorporated herein. The propylene-alpha-olefin copolymer can include blocks of isotactic polypropylene and blocks of atactic polypropylene.

Suitable commercially propylene-alpha-olefin copolymers are available under a variety of trade designations including, e.g., the VISTAMAXX series of trade designations from ExxonMobil Chemical Company (Houston, Tex.) including VISTAMAXX 8880 propylene-ethylene copolymer, VISTAMAXX 8780 propylene-ethylene copolymer, and VISTAMAXX 8380 propylene-ethylene copolymer, and the AERAFIN series of trade designations from Eastman Chemical Company (Kingsport, Tenn.) including AERAFIN 17 and AERAFIN 180 propylene-ethylene copolymers.

The hot melt adhesive composition includes from 0% by weight to about 30% by weight, from 5% by weight to about 25% by weight, from 5% by weight to about 20% by weight, or even from 5% by weight to about 15% by weight propylene-alpha-olefin copolymer.

Propylene Homopolymer

The propylene homopolymer exhibits a heat of fusion of from 5 J/g to 60 J/g, from about 5 J/g to about 50 J/g, from about 5 J/g to about 40 J/g, or even from about 5 J/g to about 30 J/g. The propylene homopolymer preferably has density of no greater than 0.90 g/cm$^3$ and exhibits a glass transition temperature (Tg) of no greater than about −0° C., or even no greater than about −5° C., and a viscosity less than 100,000 cP, less than 50,000 cP, less than 20,000 cP, or even less than 10,000 cP at 190° C.

Suitable propylene homopolymers are commercially available under a variety of trade designations including, e.g., L-MODU S400 and S410 propylene homopolymers from Idemitsu Kosan Co., Ltd. (Japan).

The hot melt adhesive composition optionally includes from 0% by weight to about 30% by weight, from 5% by weight to about 25% by weight, from 5% by weight to about 20% by weight, or even from 5% by weight to about 15% by weight propylene homopolymer.

Additives

The hot melt adhesive composition optionally includes a variety of additional components including, e.g., antioxidants, stabilizers, additional polymers, additional waxes, adhesion promoters, ultraviolet light stabilizers, rheology modifiers, corrosion inhibitors, colorants (e.g., pigments and dyes), fillers, flame retardants, nucleating agents, and combinations thereof.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, N.J.), and ETHYL 702 4,4'-methylene bis(2,6-di-tert-butylphenol), which is available from Albemarle Corporation (Baton Rouge, La.). When present, the adhesive composition preferably includes from about 0.1% by weight to about 2% by weight antioxidant.

The hot melt adhesive composition optionally includes waxes other than the synthetic wax described herein. Examples of such optional waxes include paraffin waxes, microcrystalline waxes, polypropylene waxes, functional waxes, and combinations thereof. One example of a polyethylene wax that exhibits a heat of fusion less than 200 J/g is LICOCENE PE520 from Clariant. Other examples of optional waxes include MICROSERE 195 microcrystalline wax from Ruger Chemical Co., Ltd., (Irvington, Pa.), FR-6513 paraffin wax from Calumet Specialty Products Partners LP (Indianapolis, Ind.). Examples of suitable functionalized waxes include functionalized functionalized polyethylene wax (e.g., maleated polyethylene wax and oxidized polyethylene wax), and combinations thereof.

Uses

The hot melt adhesive composition can be applied to or incorporated in a variety of articles including, e.g., fibers, substrates made from fibers (e.g., virgin fibers, recycled fibers, synthetic polymer fibers (e.g., nylon, rayon, polyesters, acrylics, polypropylenes, polyethylene, polyvinyl chloride, polyurethane), cellulose fibers (e.g., natural cellulose fibers such as wood pulp), natural fibers (e.g., cotton, silk and wool), and glass fibers, and combinations thereof), release liners, porous substrates, cellulose substrates, sheets (e.g., paper, and fiber sheets), paper products, woven and nonwoven webs (e.g., webs made from fibers (e.g., yarn, thread, filaments, microfibers, blown fibers, and spun fibers) perforated films, and combinations thereof), tape backings, and combinations thereof.

The hot melt adhesive composition is useful for bonding a variety of substrates including, e.g., cardboard, coated cardboard, paperboard, fiber board, virgin and recycled kraft, high and low density kraft, chipboard, treated and coated kraft and chipboard, and corrugated versions of the same, clay coated chipboard carton stock, composites, leather, fibers and substrates made from fibers (e.g., virgin fibers, recycled fibers, synthetic polymer fibers, cellulose fibers, and combinations thereof), release liners, porous substrates (e.g., woven webs, nonwoven webs, and perforated films), cellulose substrates, sheets (e.g., paper, and fiber sheets), paper products, tape backings, and combinations thereof.

The hot melt adhesive composition is useful for bonding a first substrate to a second substrate in a variety of applications and constructions including, e.g., packaging, bags, boxes, cartons, cases, trays, multi-wall bags, articles that include attachments (e.g., straws attached to drink boxes), ream wrap, cigarettes (e.g., plug wrap), filters (e.g., pleated filters and filter frames), bookbinding, paper products including, e.g., paper towels (e.g., multiple use towels), toilet paper, facial tissue, wipes, tissues, towels (e.g., paper towels), and combinations thereof.

The hot melt adhesive composition can be applied to a substrate in any useful form including, e.g., as a coating (e.g., a continuous coatings and discontinuous coatings (e.g., random, pattern, and array)), as a bead, as a film (e.g., a continuous films and discontinuous films), and combinations thereof, using any suitable application method including, e.g., slot coating, spray coating (e.g., spiral spray, random spraying, and random fiberization (e.g., melt blowing), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, "on demand" application methods, and combinations thereof.

In on demand hot melt application systems (which are also referred to as "tank free" and "tankless" systems), hot melt compositions are fed in a solid state (e.g., pellets), to a relatively small heating vessel (relative to traditional hot melt applications systems that include a pot) where the hot melt composition is melted and, typically shortly thereafter, the molten liquid is applied to a substrate. In on demand systems, a relatively large quantity of hot melt composition typically does not remain in a molten state for an extended period of time. In many existing on demand systems, the volume of molten hot melt composition is no greater than about 1 liter, or even no greater than about 500 milliliters, and the hot melt composition is maintained in a molten state for a relatively brief period of time, including, e.g., less than two hours, less than one hour, or even less than 30 minutes. Suitable on demand hot melt adhesive application systems include, e.g., InvisiPac Tank-Free Hot Melt Delivery System from Graco Minnesota Inc. (Minneapolis, Minn.) and the Freedom Hot Melt Dispensing System from Nordson Corporation (Westlake, Ohio). On demand hot melt adhesive application systems are described in U.S. Patent Publication Nos. 2013-0105039, 2013-0112709, 2013-0112279, and 2014-0042182, and U.S. Pat. No. 8,201,717, and incorporated herein.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) and ambient humidity (i.e., from 30% to 70%) unless otherwise specified.

Viscosity Test Method

Viscosity is determined in accordance with ASTM D-3236 entitled, "Standard Test Method for Apparent viscosity of Hot Melt Adhesives and Coating Materials," (Oct. 31, 1988), using a Brookfield viscometer, a Brookfield Thermosel heated sample chamber, and a number 27 spindle. The results are reported in centipoise (cP).

Set Time Test Method

A bead of adhesive composition measuring 5.08 cm by 0.24 cm is applied to a first substrate of WESTROCK 44 pound ECT 100% recycled content liner board using a MEC ASM-15N Hot Melt Bond Simulator. The temperature of the adhesive composition when it is applied to the substrate is referred to the application temperature. The application temperature is 177° C. unless otherwise noted. Two seconds after the bead of adhesive is applied to the first substrate, the bead of adhesive is contacted with the second substrate of WESTROCK 44 pound ECT 100% recycled content liner board, which is then pressed against the first substrate with a pressure of 0.21 MPa and for a period of time (referred to herein as the compression time). The Bond Simulator tinier is started when the substrates are compressed. After a pre-programmed compression time the instrument separates the two substrates by pulling on the second substrate in the Z direction and holding the first substrate in a fixed position and the force required to separate the substrates and the amount of fiber tear present on the adhesive composition is measured. Samples are run in triplicate at each compression time. Initially, the compression time is 0.5 seconds. If the three samples fail to exhibit greater than 50% Fiber Tear for each sample, the compression time is increased by 0.1 second and the test method is repeated until greater than 50% fiber tear is noted for all three samples. The set time is recorded as the compression time at which the three samples achieve greater than 50% fiber tear immediately upon separation. The set time is recorded in seconds (sec).

Fiber Tear Test Method

The percentage fiber tear is the percentage of fiber that covers the area of the adhesive after two substrates, which have been previously bonded together through the adhesive, are separated by force. The percentage of fiber tear exhibited by an adhesive composition is determined as follows. A bead of the adhesive composition measuring 15.24 cm (6 inch)× 0.24 cm (3/32 inch) is applied to a first substrate of INTERNATIONAL PAPER 32 pound ECT 100% Recycled Content liner board, using a ROCKTENN bond simulator at the specified application temperature. Two seconds after the bead of adhesive is applied to the first substrate, the bead of adhesive is contacted with a second substrate of INTERNATIONAL PAPER 32 pound ECT 100% Recycled Content liner board, which is pressed against the adhesive and the first substrate with a pressure of 0.21 MPa (30 pounds per square inch (psi)) for a period of 2 seconds. The resulting constructions are then conditioned at room temperature for at least 4 hours and then conditioned at the specified test temperature for at least 12 hours. The substrates of the construction are then separated from one another at the conditioning temperature (e.g., immediately after removing the sample from the conditioning chamber) by pulling the two substrates apart from one another by hand. The surface of the adhesive composition is observed and the percent of the surface area of the adhesive composition that is covered by fibers is determined and recorded. A minimum of five samples are prepared and tested for each hot melt adhesive composition. The results are reported in units of % fiber tear.

Melting Point Test Method

The melting point is determined according to ASTM D-3461 entitled, "Standard Test Method for Softening Point of Asphalt and Pitch (Mettler Cup and Ball Method)," with a heating rate of 2° C. per minute.

Differential Scanning Calorimetry (DSC) Test Method for Melt Temperature (Tm) and Heat of Fusion A 7.25 mg±0.25 mg sample is placed into a pan specific to the machine being used (e.g., TA Q2000 DSC V24.11 with standard aluminum pans and lids). The sample is then covered with a specified lid and closed. A pan and lid containing no material are also closed and used as a reference sample. The sample is then loaded into the differential calorimeter posts and covered with a nitrogen blanket. The sample is then heated at a rate of 60° C. until the sample reaches 190° C. The sample is then put into an isothermal state for 5 minutes at 190° C. The sample is then cooled at a rate of 10° C. per minute until the sample reaches a temperature of −80° C. Then the sample is again put into an isothermal state for 5 minutes at −80° C. The sample is then heated at 10° C. per minute until the sample reaches 190° C. The resulting data is represented in graphical exothermal down format containing Heat Flow versus Temperature. The Tm (melt temperature) is taken as the peak of the greatest magnitude during the second melt and is reported in degrees Celsius (° C.). The heat of fusion (Hfus) is taken during the second melt and is reported in Joules per gram (J/g).

Clarity and Homogeneity Test Method

Clarity and homogeneity of the adhesive composition is tested by pre-heating the hot melt adhesive composition to form a liquid melt and pouring approximately 15 grams of the adhesive composition into 25 mm×150 mm borosilicate glass test tubes (Fisherbrand) and then placing the test tubes in an oven and heating the composition to a temperature that is the lowest temperature at which the viscosity of the adhesive composition is below 1500 cps (e.g., 177° C., 135° C., or 121° C.), and observing the composition using the unaided eye after approximately 16 hours and after 48 hours.

Clarity

Observation is accomplished by removing the test tubes individually from the oven and immediately placing them in front of a template with a black 1/16 in line on a white background, observing the clarity of the black line through the liquid adhesive composition, and recording the observations. If no turbidity is noted, and the black line is visible without any distortion, the sample is classified as clear. The presence of slight turbidity that still allows the black line to be clearly distinguished is classified as hazy. Failure to observe a distinct black line is classified as cloudy.

Homogeneity

Phase separation, if present, is observed if two distinct layers have formed.

Peel Adhesion Failure Test Method

Peel adhesion failure temperature ("PAFT") is tested according to the standard PAFT test in ASTM D-4498, except that the thickness of the test piece sandwich is 10 mils+/−2 mils, the oven temperature is increased automatically at a temperature increase of 25° C./hour rather than manually, and a 100 gram weight is used.

Examples E1-E7 and Controls C1 and C2

Examples E1-E7 and Controls C1 and C2 were prepared by combining the components in the amounts (in % by weight) specified in Table 1 and heating the same to from 175° C. to 190° C. with mixing. Examples E1-E7 and Controls C1 and C2 were then tested according to the Viscosity, Set Time, % Fiber Tear and PAFT test methods, with the exception that the viscosity was measured at 177° C., 149° C. or 135° C., as indicated in the table, and the Set Time and % Fiber Tear were measured at application temperatures of 177° C. or 149° C., as indicated in the table. The clarity and homogeneity were also determined. The results are reported in Table 1.

TABLE 1

| Example | E1 | C1 | E2 | C2 | E3 | E4 | E5 | E6 | E7 |
|---|---|---|---|---|---|---|---|---|---|
| AFFINITY GA-1950[1] | 13.00 | 13.00 | 0 | 0 | 0 | 0 | 0 | 0 | 18.00 |
| AFFINITY GA-1900[2] | 0 | 0 | 13.00 | 13.00 | 13.00 | 18.00 | 13.00 | 13.00 | 0 |
| ATEVA 1880A BK[3] | 13.00 | 0 | 0 | 0 | 0 | 0 | 0 | 0 | 0 |
| ATEVA 2842A[4] | 0 | 13.00 | 0 | 0 | 0 | 0 | 0 | 0 | 0 |
| ALCUDIA 407[5] | 0 | 0 | 13.00 | 0 | 0 | 0 | 0 | 0 | 0 |
| ESCORENE MV2528[6] | 0 | 0 | 0 | 13.00 | 0 | 0 | 0 | 0 | 0 |
| VISTAMAXX 8780[7] | 0 | 0 | 0 | 0 | 13.00 | 8.00 | 0 | 0 | 0 |
| VISTAMAXX 8380[8] | 0 | 0 | 0 | 0 | 0 | 0 | 0 | 0 | 8.00 |
| ENABLE 3390[9] | 0 | 0 | 0 | 0 | 0 | 0 | 13.00 | 0 | 0 |
| ALCUDIA PA-27150[10] | 0 | 0 | 0 | 0 | 0 | 0 | 0 | 13.00 | 0 |
| KRATON G 1652[11] | 2.00 | 2.00 | 2.00 | 2.00 | 2.00 | 2.00 | 2.00 | 2.00 | 2.00 |
| KRATON G 1657[12] | 4.00 | 4.00 | 4.00 | 4.00 | 4.00 | 4.00 | 4.00 | 4.00 | 4.00 |
| RESINALL R1030[13] | 38.40 | 38.40 | 0 | 0 | 0 | 0 | 38.4 | 38.4 | 38.4 |
| ESCOREZ 5400[14] | 0 | 0 | 38.40 | 38.40 | 38.40 | 38.40 | 0 | 0 | 0 |
| SX-105[15] | 29.00 | 29.00 | 0 | 0 | 0 | 0 | 29.0 | 29.0 | 29.0 |
| C-80[16] | 0 | 0 | 29.00 | 29.00 | 29.00 | 29.00 | 0 | 0 | 0 |
| EVERNOX 1010 GF[17] | 0.40 | 0.40 | 0.40 | 0.40 | 0.40 | 0.40 | 0.4 | 0.4 | 0.4 |
| EVERNOX 76G[18] | 0.20 | 0.20 | 0.20 | 0.20 | 0.20 | 0.20 | 0.2 | 0.2 | 0.2 |
| Viscosity at 177° C. (cP) | 1165 | N.T. | 520 | N.T. | N.T. | N.T. | 835 | 1095 | 1190 |
| Viscosity at 149° C. (cP) | N.T. | N.T. | 995 | N.T. | 1040 | 1065 | N.T. | N.T. | N.T. |
| Viscosity at 135° C.(cP) | N.T. | N.T. | 1475 | N.T. | 1600 | 1575 | N.T. | N.T. | N.T. |
| Clarity/Homogeneity at 177° C. after 16 hours | Clear/H[19] | Separated | Clear/H | Separated | Clear/H | Clear/H | Hazy/H | Clear/H | Hazy/H |
| Application Temperature for Set Time and % Fiber Tear Testing | 177° C. | NA | 149° C. | NA | 149° C. | 149° C. | 177° C. | 177° C. | 177° C. |
| Set Time (sec) | 0.4 | N.T. | 0.5 | N.T. | 0.7 | 0.5 | 0.3 | 0.5 | 0.4 |
| % Fiber Tear | | | | | | | | | |
| 22° C. | 100 | N.T. | 100 | N.T. | 100 | 100 | 93 | 100 | 100 |
| 4° C. | 100 | N.T. | 99 | N.T. | 98 | 99 | 97 | 100 | 100 |

TABLE 1-continued

| Example | E1 | C1 | E2 | C2 | E3 | E4 | E5 | E6 | E7 |
|---|---|---|---|---|---|---|---|---|---|
| −18° C. | 95 | N.T. | 98 | N.T. | 97 | 98 | 93 | 97 | 99 |
| −29° C. | 100 | N.T. | 100 | N.T. | 98 | 98 | 98 | 100 | 100 |
| PAFT (° C.) | 74 | N.T. | 55 | N.T. | 54 | 53 | 67 | 68 | 69 |

1 = AFFINITY GA-1950 ethylene-octene interpolymer (DowDuPont Chemicals Company, Midland, Michigan)
2 = AFFINITY GA-1900 ethylene-octene interpolymer (DowDuPont Chemicals Company, Midland, Michigan)
3 = ATEVA 1880A ethylene vinyl acetate copolymer having a vinyl acetate content of 6.7 mole % (AT Plastics Inc., Edmonton, Alberta, Canada)
4 = ATEVA 2842A ethylene vinyl acetate copolymer having a vinyl acetate content of 11.2 mole % (AT Plastics Inc., Edmonton, Alberta, Canada)
5 = ALCUDIA PA-407 ethylene vinyl acetate copolymer having a vinyl acetate content of 5.5 mole % (Repsol, Taipei City, Tawain)
6 = ESCORENE 2528 ethylene vinyl acetate copolymer having a vinyl acetate content of 11.2 mole % and a melt index of 900 g/10 min (Exxon Chemical)
7 = VISTAMAXX 8780 metallocene-catalyzed polypropylene/ethylene copolymer having an ethylene content of 17.0 mole % (ExxonMobil)
8 = VISTAMAXX 8380 metallocene-catalyzed polypropylene/ethylene copolymer having an ethylene content of 17.5 mole % (ExxonMobil)
9 = ENABLE 33900 ethylene n-butyl acrylate copolymer having a butyl acrylate content of 9.7 mole % and a melt index of 900 g/10 min (Exxon Chemical)
10 = ALCUDIA PA-27150 ethylene n-butyl acrylate copolymer having a butyl acrylate content of 7.5 mole % and a melt index of 150 g/10 min (Repsol, Taipei City, Tawain)
11 = KRATON G 1652 styrene-ethylene-butylene-styrene (Shell Chemical Company, Houston, Texas)
12 = KRATON G 1657 styrene-ethylene-butylene-styrene (Shell Chemical Company, Houston, Texas)
13 = RESINALL R1030 hydrogenated cycloaliphatic hydrocarbon resin (Akrochem Corporation, Akron, Ohio)
14 = ESCOREZ 5400 hydrogenated cycloaliphatic hydrocarbon resin (ExxonMobil)
15 = SX-105 Fischer Tropsch wax (Shell Malaysia Ltd., Kuala Lumpur, Malaysia)
16 = C80 Fischer Tropsch wax (Sasol Wax North America Corporation (Hayward, California)
17 = EVERNOX 1010 hindered phenolic antioxidant (BASF Corporation, Florham Park, New Jersey)
18 = EVERNOX 76G hindered phenolic antioxidant (BASF Corporation, Florham Park, New Jersey)
NT = Not Tested
19 H = Homogeneous

Examples E8-E16 and C3

Examples E8-E16 and C3 were prepared by combining the components in the amounts (in % by weight) specified in Table 2 and heating the same to from 175° C. to 190° C. with mixing. Examples E8-E16 and C3 were then tested according to the Viscosity, Set Time, % Fiber Tear and PAFT test methods, with the exception that the viscosity was measured at 177° C., 149° C. or 135° C., as indicated in the table, and the Set Time and % Fiber Tear were measured at an application temperature of 177° C. or 149° C., as indicated in the table. The clarity and homogeneity were also determined. The results are reported in Table 2.

TABLE 2

| Example | E8 | E9 | E10 | E11 | E12 | E13 | E14 | E15 | E16 | C3 |
|---|---|---|---|---|---|---|---|---|---|---|
| AFFINITY GA-1950 | 10.00 | 5.00 | 8.00 | 0 | 0 | 0 | 10.00 | 5.00 | 8.00 | 0 |
| AFFINITY GA-1900 | 0 | 0 | 0 | 10.00 | 5.00 | 8.00 | 0 | 0 | 0 | 16.00 |
| AFFINITY GA-1000R[20] | 3.00 | 8.00 | 5.00 | 3.00 | 8.00 | 5.00 | 3.00 | 8.00 | 5.00 | 0 |
| EVA 18:500 AT EVA 1880A | 13.00 | 13.00 | 13.00 | 0 | 0 | 0 | 0 | 0 | 0 | 0 |
| ALCUDIA PA-27150 | 0 | 0 | 0 | 0 | 0 | 0 | 13.00 | 13.00 | 13.00 | 0 |
| VISTAMAXX 8780 | 0 | 0 | 0 | 13.00 | 13.00 | 13.00 | 0 | 0 | 0 | 16.00 |
| KRATON G 1652 | 2.00 | 2.00 | 2.00 | 2.00 | 2.00 | 2.00 | 2.00 | 2.00 | 2.00 | 0 |
| KRATON G 1657 | 4.00 | 4.00 | 4.00 | 4.00 | 4.00 | 4.00 | 4.00 | 4.00 | 4.00 | 0 |
| RESINALL R-1030 | 38.40 | 38.40 | 38.40 | 0 | 0 | 0 | 38.40 | 38.40 | 38.40 | 0 |
| ESCOREZ 5400 | 0 | 0 | 0 | 38.40 | 38.40 | 38.40 | 0 | 0 | 0 | 38.40 |
| SARAWAX SX105 | 29.00 | 29.00 | 10.00 | 0 | 0 | 0 | 29.00 | 29.00 | 10.00 | 0 |
| TRECORA CWP-400[21] | 0 | 0 | 19.00 | 0 | 0 | 10.00 | 0 | 0 | 19.00 | 0 |
| C-80 | 0 | 0 | 0 | 29.00 | 29.00 | 19.00 | 0 | 0 | 0 | 29.00 |
| EVERNOX 1010 GF | 0.40 | 0.40 | 0.40 | 0.40 | 0.40 | 0.40 | 0.40 | 0.40 | 0.40 | 0 |
| EVERNOX 76G | 0.20 | 0.20 | 0.20 | 0.20 | 0.20 | 0.20 | 0.20 | 0.20 | 0.20 | 0 |
| Total Solids | 100.00 | 100.00 | 100.00 | 100.00 | 100.00 | 100.00 | 100.00 | 100.00 | 100.00 | 100.00 |
| Clarity/Homogeneity at 177° C. after 16 hours | Clear/H | Clear/H | Clear/H | Clear/H | Clear/H | Clear/H | Clear/H | Clear/H | Clear/H | NT |
| Viscosity at 177° C. (cp) | 1125 | 1060 | 1030 | NT | NT | NT | 1445 | 1430 | 1405 | NT |
| Viscosity at 149° C. (cP) | NT | NT | NT | 1020 | 1030 | 1105 | NT | NT | NT | 500 |

TABLE 2-continued

| Example | E8 | E9 | E10 | E11 | E12 | E13 | E14 | E15 | E16 | C3 |
|---|---|---|---|---|---|---|---|---|---|---|
| Viscosity at 135° C. (cP) | NT | NT | NT | NT | NT | NT | NT | NT | NT | 720 |
| Viscosity at 121° C. (cP) | NT | NT | NT | NT | NT | NT | NT | NT | NT | 1085 |
| Clarity/Homogeneity at 177° C. after 48 hours | Clear/H | Clear/H | Clear/H | Clear/H | Clear/H | Clear/H | Clear/H | Clear/H | Clear/H | Clear/H |
| PAFT (° C.) | 71.9 | 72.1 | 67.7 | 53.9 | 53.5 | 52.4 | 72.0 | 71.6 | 67.4 | 49.0 |
| Application Temperature for Set Time and % Fiber Tear Testing | 177° C. | 177° C. | 177° C. | 149° C. | 149° C. | 149° C. | 177° C. | 177° C. | 177° C. | 149° C. |
| Set Time (sec) | 0.4 | 0.3 | 0.3 | 0.7 | 0.7 | 0.6 | 0.4 | 0.4 | 0.4 | 0.8 |
| % Fiber Tear | | | | | | | | | | |
| −29° C. | 99 | 100 | 100 | 99 | 99 | 97 | 100 | 100 | 100 | 4 |
| −18° C. | 98 | 93 | 96 | 96 | 95 | 97 | 98 | 98 | 99 | 3 |
| 4° C. | 100 | 100 | 98 | 98 | 96 | 96 | 98 | 99 | 98 | 47 |
| 24° C. | 99 | 100 | 96 | 98 | 100 | 99 | 98 | 100 | 100 | 81 |

20 = AFFINITY GA-1000R maleic anhydride modified ethylene-octene copolymer (DowDuPont Chemicals Company, Midland, Michigan)
21 = TRECORA CWP-400 polyethylene wax (Trecora Chemical, Pasadena, Texas)

Examples E17-E20

Examples E17-E20 were prepared by combining the components in the amounts (in % by weight) specified in Table 3 and heating the same to from 175° C. to 190° C. with mixing. Examples E17-E20 were then tested according to the Viscosity, Set Time, % Fiber Tear and PAFT test methods, with the exception that the viscosity was measured at 177° C., 149° C. or 135° C., as indicated in the table, and the Set Time and % Fiber Tear were measured at an application temperature of 177° C. or 149° C., as indicated in the table. The clarity and homogeneity were also determined. The results are reported in Table 3.

TABLE 3

| Example | E17 | E18 | E19 | E20 |
|---|---|---|---|---|
| AFFINITY GA 1950 | 0 | 0 | 13.00 | 18.00 |
| AFFINITY GA-1900 | 13.00 | 18.00 | 0 | 0 |
| AERAFIN 17[22] | 13.00 | 8.00 | 0 | 0 |
| AERAFIN 180[23] | 0 | 0 | 13.00 | 8.00 |
| KRATON G-1652 | 2.00 | 2.00 | 2.00 | 2.00 |
| KRATON G-1657 | 4.00 | 4.00 | 4.00 | 4.00 |
| ESCOREZ 5637 | 0 | 0 | 38.40 | 38.40 |
| ESCOREZ 5400 | 38.40 | 38.40 | 0 | 0 |
| SARA WAX SX105 | 0 | 0 | 29.00 | 29.00 |
| C-80 | 29.00 | 29.00 | 0 | 0 |
| EVERNOX 1010 GF | 0.40 | 0.40 | 0.40 | 0.40 |
| EVERNOX 76G | 0.20 | 0.20 | 0.20 | 0.20 |
| Total Solids | 100.00 | 100.00 | 100.00 | 100.00 |
| Clarity/Homogeneity after 16 hours | Hazy/H (at 135° C.) | Hazy/H (at 135° C.) | Hazy/H (at 177° C.) | Hazy/H (at 177° C.) |
| Viscosity at 177° C. (cP) | NT | NT | 1310 | 1289 |
| Viscosity at 149° C. (cP) | 770 | 885 | NT | NT |
| Viscosity at 135° C. (cP) | 1175 | 1400 | NT | NT |
| Clarity/Homogeneity after 48 hours | Clear/H (at 135° C.) | Clear/H (at 135° C.) | Clear/H (at 177° C.) | Clear/H (at 177° C.) |
| PAFT (° C.) | 51.7 | 52.8 | 66.7 | 66.7 |
| Application Temperature for Set Time and % Fiber Tear Testing | 135° C. | 135° C. | 177° C. | 177° C. |
| Set Time (sec) | 0.5 | 0.6 | 0.6 | 0.4 |
| % Fiber Tear | | | | |
| −29° C. | 83 | 92 | 98 | 98 |
| −18° C. | 70 | 94 | 100 | 98 |
| 4° C. | 92 | 96 | 100 | 98 |
| 24° C. | 94 | 100 | 100 | 99 |

22 = AERAFIN 17 propylene-ethylene copolymer (Eastman Chemical Company, Kingsport, Tennessee)
23 = AERAFIN 180 propylene-ethylene copolymer (Eastman)

Examples E21 and E22

Examples E21 and E22 were prepared by combining the components in the amounts (in % by weight) specified in Table 4 and heating the same to from 175° C. to 190° C. with mixing. Examples E21 and E22 were then tested according to the Viscosity, Set Time, % Fiber Tear and PAFT test methods, with the exception that the viscosity was measured at 177° C., 149° C. or 135° C., as indicated in the table, and the Set Time and % Fiber Tear were measured at an application temperature of 177° C. or 149° C., as indicated in the table. The clarity and homogeneity were also determined. The results are reported in Table 4.

TABLE 4

| Example | E21 | E72 |
|---|---|---|
| AFFINITY GA-1900 | 13 | 20 |
| L MODU S410 | 13 | 6 |
| KRATON G-1652 | 2 | 2 |
| KRATON G-1657 | 4 | 4 |

TABLE 4-continued

| Example | E21 | E72 |
|---|---|---|
| ESCOREZ 5400 | 38.4 | 38.4 |
| C-80 | 29 | 29 |
| IRGANOX 1010 | 0.4 | 0.4 |
| IRGANOX 1076 | 0.2 | 0.7 |
| Clarity/Homogeneity after 16 hours | Clear | Clear |
| Viscosity at 177° C. (cP) | 560 | 550 |
| Viscosity at 149° C. (cP) | 1095 | 1070 |
| Viscosity at 135° C. (cP) | 1675 | 1615 |
| PAFT (° C.) | | |
| Set Time (see) (Application Temp. 149° C.) | 0.6 | 0.6 |
| % Fiber Tear (Application temperature at 177° C.) | | |
| 22° C. | 97 | 98 |
| 4° C. | 100 | 100 |
| −18° C. | 97 | 99 |
| −29° C. | 100 | 100 |

Other embodiments are within the claims. All documents referred to herein are incorporated herein to the extent that they do not conflict.

What is claimed is:

1. A hot melt adhesive composition comprising:
a first copolymer comprising an ethylene alpha-olefin copolymer having a density of no greater than 0.90 grams per cubic centimeter (g/cm$^3$);
a second copolymer comprising styrene block copolymer;
tackifying agent;
synthetic wax having a melt temperature of at least 70° C. and a heat of fusion of at least 200 Joules/gram (J/g); and
at least 5% by weight ethylene vinyl acetate, the ethylene vinyl acetate being derived from at least 90 mole % ethylene and no greater than 8 mole % vinyl acetate.

2. The hot melt adhesive composition of claim 1, wherein the synthetic wax is a wax derived from ethylene, a Fischer Tropsch wax, or a combination thereof.

3. The hot melt adhesive composition of claim 1, wherein the composition exhibits a set time of no greater than 1 second.

4. The hot melt adhesive composition of claim 1, wherein the composition exhibits a set time of no greater than 0.8 seconds.

5. The hot melt adhesive composition of claim 1, wherein the composition exhibits a viscosity of no greater than 1500 cP at 177° C.

6. The hot melt adhesive composition of claim 1, wherein the composition exhibits a viscosity of no greater than 1500 cP at a temperature of no greater than 135° C.

7. The hot melt adhesive composition of claim 1, wherein the composition exhibits a viscosity of no greater than 1500 cP at 121° C.

8. The hot melt adhesive composition of claim 1 comprising
from 5% by weight to 25% by weight of the ethylene alpha-olefin copolymer,
from 2% by weight to 15% by weight styrene block copolymer,
from 15% by weight to 50% by weight tackifying agent,
from 10% by weight to 35% by weight of the synthetic wax, and
from 5% by weight to 25% by weight of the ethylene vinyl acetate.

9. The hot melt adhesive composition of claim 1, wherein the styrene block copolymer comprises styrene-isoprene-styrene, styrene-butadiene-styrene, styrene-ethylene-propylene-styrene, styrene-ethylene-butylene-styrene, styrene-ethylene-ethylene-propylene-styrene, or a combination thereof.

10. The hot melt adhesive composition of claim 1, wherein the styrene block copolymer comprises styrene-ethylene-butylene-styrene.

11. The hot melt adhesive composition of claim 1, wherein the styrene block copolymer is derived from less than 35% by weight styrene.

12. The hot melt adhesive composition of claim 1, wherein the ethylene vinyl acetate is derived from less than 20% by weight vinyl acetate.

13. The hot melt adhesive composition of claim 1, wherein the composition exhibits a peel adhesion failure temperature of at least 50° C.

14. The hot melt adhesive composition of claim 1, wherein the composition exhibits at least 50% fiber tear at −29° C.

15. The hot melt adhesive composition of claim 1, wherein the composition is homogeneous when tested according to the Clarity and Homogeneity Test Method.

16. A hot melt adhesive composition comprising:
a first copolymer comprising an ethylene alpha-olefin copolymer having a density of no greater than 0.90 grams per cubic centimeter (g/cm$^3$);
a second copolymer comprising styrene block copolymer;
tackifying agent;
synthetic wax having a melt temperature of at least 70° C. and a heat of fusion of at least 200 Joules/gram (J/g); and
at least 5% by weight ethylene-polar comonomer copolymer derived from at least 90 mole % ethylene and no greater than 10 mole % polar co-monomer, the ethylene-polar comonomer copolymer comprising ethylene alkyl-acrylate,
the hot melt adhesive composition exhibiting a set time of no greater than 0.8 seconds.

17. The hot melt adhesive composition of claim 16, wherein the ethylene-polar comonomer copolymer is selected from the group consisting of ethylene methyl acrylate, ethylene n-butyl acrylate, and combinations thereof.

18. The hot melt adhesive composition of claim 16, wherein the ethylene-polar comonomer copolymer is ethylene-n-butyl acrylate.

19. The hot melt adhesive composition of claim 18, wherein the ethylene n-butyl acrylate is derived from less than 30% by weight n-butyl acrylate.

20. The hot melt adhesive composition of claim 19, wherein the styrene block copolymer is derived from less than 35% by weight styrene.

21. A hot melt adhesive composition comprising:
a first copolymer comprising an ethylene alpha-olefin copolymer having a density of no greater than 0.90 grams per cubic centimeter (g/cm$^3$);
a second copolymer comprising styrene block copolymer;
tackifying agent;
synthetic wax having a melt temperature of at least 70° C. and a heat of fusion of at least 200 Joules/gram (J/g); and
at least 5% by weight of a third polymer selected from the group consisting of
propylene-alpha-olefin copolymer derived from at least 8 mole % co-monomer, having a heat of fusion of from at least 5 J/g to no greater than 60 J/g, and a polydispersity index of no greater than 10, and
propylene homopolymer having a heat of fusion of from at least 5 J/g to no greater than 60 J/g.

22. The hot melt adhesive composition of claim 16 comprising
- from 5% by weight to 25% by weight of the ethylene alpha-olefin copolymer,
- from 2% by weight to 15% by weight styrene block copolymer,
- from 15% by weight to 50% by weight tackifying agent,
- from 10% by weight to 35% by weight of the synthetic wax, and
- from 5% by weight to 25% by weight of the ethylene-polar comonomer copolymer.

23. The hot melt adhesive composition of claim 1, wherein the composition exhibits at least 80% fiber tear at −29° C.

* * * * *